US008718671B2

(12) United States Patent
Barbeau et al.

(10) Patent No.: US 8,718,671 B2
(45) Date of Patent: May 6, 2014

(54) ADAPTIVE LOCATION DATA BUFFERING FOR LOCATION-AWARE APPLICATIONS (75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 654 days.

(21) Appl. No.: 13/082,722

(22) Filed: Apr. 8, 2011

(65) Prior Publication Data
US 2011/0275384 A1 Nov. 10, 2011

Related U.S. Application Data (63) Continuation of application No. PCT/US2009/059985, filed on Oct. 8, 2009.

(60) Provisional application No. 61/103,767, filed on Oct. 8, 2008.

(51) Int. Cl.
*H04W 24/00* (2009.01)

(52) U.S. Cl.
USPC ................. 455/456.1; 455/456.5; 455/456.6

(58) Field of Classification Search
None
See application file for complete search history.

(56) References Cited

U.S. PATENT DOCUMENTS

| 6,831,598 | B2 | 12/2004 | Saint-Hilaire et al. |
| 7,136,364 | B2 | 11/2006 | Saint-Hilaire et al. |
| 2003/0206549 | A1 | 11/2003 | Mody et al. |
| 2004/0221004 | A1 | 11/2004 | Chalfin et al. |
| 2005/0021821 | A1 | 1/2005 | Turnbull et al. |
| 2005/0117529 | A1 | 6/2005 | Ramos-Escano et al. |
| 2006/0245406 | A1 | 11/2006 | Shim |

FOREIGN PATENT DOCUMENTS

WO 2004077785 A1 9/2004

OTHER PUBLICATIONS

International Search Report for PCT/US2009/059985, dated May 31, 2010.
International Search Report for PCT/US2009/059825, dated May 17, 2010.
Skyhook Wireless, Inc, How It Works: XPS Overview, dated Jul. 31, 2008, accessed via http://web.archive.org/web/20080731065440/ http://www.skyhookwireless.com/howitworks/, on Jun. 23, 2011.
ABI: GPS Handset Market Poised for Huge Expansion/GPS World, http://www.gpsworld.com/news/abi-gps-handset-market-poised-huge-expansion-3864, dated May 9, 2008, accessed Jun. 22, 2011.
Aldawoodi, An Approach to Designing an Unmanned Helicopter Autopilot Using Genetic Algorithms and Simulated Annealing, PhD. diss., University of South Florida, Jun. 1, 2008, pp. 1-228.

(Continued)

*Primary Examiner* — Erika A Washington
(74) *Attorney, Agent, or Firm* — Molly Sauter; Courtney Dunn; Smith & Hopen, P.A.

(57) ABSTRACT

A method of buffering location data on a mobile device. The method transmits location data packets via an unreliable protocol to a receiving device and buffers a copy of the location data packet. Periodically, the method also transmits a location data packet via a reliable protocol to the receiving device. When no acknowledgement is received from the receiving device, the location data sent via the reliable protocol is buffered to memory. Once an acknowledgement is received from the receiving device, all of the buffered location data is sent to the receiving device via an unreliable protocol.

78 Claims, 8 Drawing Sheets

(56) References Cited

OTHER PUBLICATIONS

Amin et al., Mobile Century Using GPS Mobile Phones as Traffic Sensors: A Field Experiment, 15th World Congress on Intelligent Transportation Systems, Nov. 2008, New York, pp. 1-4.

Zhao, Standardization of Mobile Phone Positioning for 3G Systems, IEEE Communications Magazine, Jul. 2002, vol. 40, No. 7, pp. 108-116.

Chen et al., LORE: An Infrastructure to Support Location-Aware Services, IBM Journal of Research and Development, Sep./Nov. 2004, vol. 48, No. 516, pp. 601-615.

Prasithsangaree et al., Analysis of Energy Consumption of RC4 and AES Algorithms in Wireless LANs, IEEE Global Telecommunications Conference, Dec. 2003, San Francisco, CA. vol. 3, pp. 1445-1449.

Barbeau et al., Dynamic Management of Real-Time Location Data on GPS-Enabled Mobile Phones, Second International Conference on Mobile Ubiquitous Computing Systems, Services and Technologies, Valencia Spain, Sep. 2008, pp. 1-6.

Hoh et al., Virtual Trip Lines for Distributed Privacy-Preserving Traffic Monitoring, MobiSys, Breckenridge, Colorado, USA, Jun. 17-20, 2008, pp. 1-14.

Barbeau et al., A General Architecture in Support of Interactive, Multimedia, Location-Based Mobile Applications, IEEE Communications Magazine, Nov. 2006, vol. 44, No. 11, pp. 156-163.

Bellavista et al., The PoSIM Middleware for Translucent and Context-Aware Integrated Management of Heterogeneous Positioning Systems, Computer Communications, Apr. 2008, vol. 31, No. 6, pp. 1078-1090.

Kupper et al., TraX: A Device-Centric Middleware Framework for Location-Based Services, IEEE Communications Magazine, Sep. 2006, vol. 44, No. 9, pp. 114-120.

Shah et al., An Architecture for Location Tracking Using SIP, IEEE Global Telecommunications Conference, Nov. 2007, Washington, D.C., pp. 124-128.

Zundt et al., Realizing Peer-To-Peer Location-Based Services in Mobile Networks, Proceedings of the 2nd Workshop on Positioning, Navigation and Communication (WPNC'05) & 1st Utra-Wideband Expert Talk (UET'05), Mar. 2005, Hanover, Germany, pp. 175-182.

Mintz-Habib et al., A VoIP Emergency Services Architecture and Prototype, Fourteenth International Conference on Computer Communications and Networks, Oct. 2005, San Diego, CA, pp. 523-528.

Shi et al., Performance Evaluation of Line Simplification Algorithms for Vector Generalization, The Cartographic Journal, Mar. 2006, vol. 43, No. 1, pp. 27-44.

Persad-Maharaj et al., Real-Time Travel Path Prediction Using GPS-Enabled Mobile Phones, Fifteenth World Congress on Intelligent Transportation Systems, Nov. 2008, New York, NY, pp. 1-12.

Spanoudakis et al., Extensible Platform for Location Based Services Provisioning, Proceedings of the Fourth International Conference on Web Information Systems Engineering Workshops, 2004, pp. 1-8.

FIG. 5

ADAPTIVE LOCATION DATA BUFFERING FOR LOCATION-AWARE APPLICATIONS

CROSS REFERENCE TO RELATED APPLICATIONS

This application is a Continuation of currently pending International Application No. PCT/2009/059985, filed Oct. 8, 2009, herein incorporated by reference, which claims priority to U.S. Provisional Patent Application No. 61/103,767, filed Oct. 8, 2008, which is herein incorporated by reference.

STATEMENT OF GOVERNMENT INTEREST

This invention was made with Government support under Grant No. FDOT-BD-549, RPWO#35, NCTR-77709-00 awarded by the Florida Department of Transportation. The Government has certain rights in the invention.

FIELD OF INVENTION

This invention relates to wireless communication devices and, in particular, improving reliability of location data transmitted by location-aware applications.

BACKGROUND

Location-Aware applications are built on the knowledge of a mobile device's current geographic position as well as the knowledge of geographic positions of other users, places, or things. Mobile devices often recalculate their position very frequently, up to multiple times in a single second in some systems. Using positioning systems such as Global Positioning Systems (GPS) to frequently recalculate the position of the mobile device costs energy. Additionally, transferring that updated location data from the device to a server or another device through wireless communications also costs energy. Therefore, even though it is desirable to frequently update the system (including mobiles devices and servers) with the knowledge of the position of the device, there is a significant resource cost involved in both the position calculation and wireless transfer of data.

To save device resources, including power, during repeated transmissions of position data, "unreliable" or "connection-less" protocols such as User Datagram Protocol (UDP) can be used. UDP does not verify the receipt of data packets or the order in which they are received, whereas "reliable" or connection-oriented protocols, such as Transmission Control Protocol (TCP), do. However, UDP also avoids the extra transmission overhead that TCP requires in order to acknowledge the receipt of packets and request the re-submission of packets that were lost or corrupted. Therefore, UDP costs less energy per location data packet transferred than TCP and, therefore, is preferred when repeatedly transferring location data from (and to) a mobile device. Additionally, the entity (e.g. server or mobile device) receiving the data is not under as much of a strain because it does not have to acknowledge the receipt of each packet.

However, because UDP is unreliable, the receipt of location data by the receiving party is not guaranteed. In wireless systems that are highly likely to have lost or corrupted data packets, as well as a mobile device such as a mobile phone that may prevent the transfer or reception of data at certain times (i.e. during an active phone call, lack of cell phone signal), a large amount of data may be lost if the ordinary UDP protocol is used. Also, significant device battery life is unnecessarily wasted when transmitting via UDP if the other entity is not receiving the information.

SUMMARY

The present invention includes an adaptive location data buffering method for location-aware applications, such as those running on GPS-enabled mobile phones. It uses a two-layer protocol approach: an unreliable, connection-less protocol, such as UDP, is utilized to transport frequently calculated (e.g. real-time) location data from one entity (e.g. mobile phone, PDA, server) to another (e.g. mobile phone, PDA, server), while a reliable, connection-oriented protocol, such as TCP, is utilized to determine the current quality of service for the unreliable protocol transmissions.

The adaptive location data buffering method transmits data via an unreliable protocol (e.g. UDP). A copy of this data is also stored for a period of time. Then, the method transmits via a reliable protocol (e.g. TCP) and awaits a response from the receiving device (e.g. a server or other mobile device). If no response is received, the data is buffered for a period of time until a transmission via reliable protocol is tried again and succeeds. Once a successful transmission via a reliable protocol is achieved, all of the buffered data is sent via an unreliable protocol and the buffer is cleared.

BRIEF DESCRIPTION OF THE DRAWINGS

For a fuller understanding of the invention, reference should be made to the following detailed description, taken in connection with the accompanying drawings, in which.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes an adaptive location data buffering method for location-aware applications, such as those running on GPS-enabled mobile phones. It uses a two-layer protocol approach: an unreliable, connection-less protocol, such as UDP, is utilized to transport frequently calculated (e.g. real-time) location data from one entity (e.g. mobile phone, PDA, server) to another (e.g. mobile phone, PDA, server), while a reliable, connection-oriented protocol, such as TCP, is utilized to determine the current quality of service for the unreliable protocol transmissions.

Using a connectionless protocol, such as UDP, provides the timeliness, efficiency, and scalability required for real-time location-aware systems because no acknowledgements, handshakes, or retransmissions occur. Utilizing a connection-oriented protocol such as TCP allows the system to occasionally check for quality of service issues (i.e. is location data getting to the server?). If there is a temporary problem with receiving transmission via an unreliable protocol, then the mobile device can temporarily buffer the data until it is determined that a there is a strong probability that unreliable protocol transmissions will again be able to reach the server. This maximizes the probability of unreliable protocol transmissions being properly received by the receiver without the heavy overhead of a reliable protocol. This method also prevents the device from unnecessarily wasting battery energy by transmitting packets via an unreliable protocol when they are not being received by the receiving party. Herein, UDP and TCP are used only as examples, any connectionless and connection-oriented protocols, respectively, can be utilized by this method.

Figure 1:
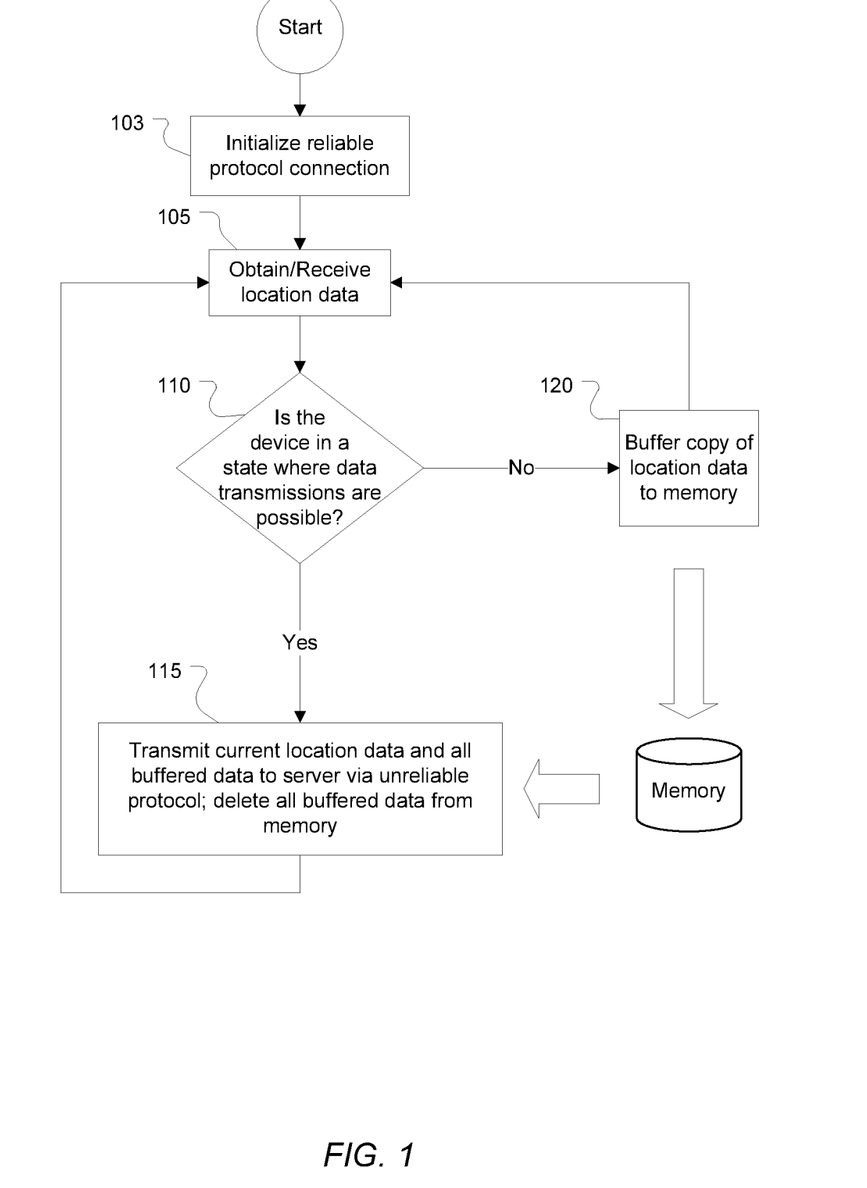
FIG. 1 is a flowchart of the adaptive location data buffering method using only an unreliable protocol in accordance with an embodiment of the present invention.

In an embodiment, as shown in the flowchart in FIG. 1, which illustrates the method from the perspective of an application running on a mobile device, the method begins by initializing a reliable protocol connection (operation 103). The Generic Connection Framework may be used to create and utilize reliable (and unreliable) connection(s). Then the location data is received or obtained in operation 105. This location data may be GPS data received from an on-board GPS or a remote GPS system. However, GPS data is an example, and any type of location data may be used. The location data may also be calculated remotely, such as at the server or at another mobile device, and then received by the mobile device. Under normal conditions, an unreliable protocol is used to efficiently transfer data to a receiving device (e.g. a server) (operation 115). The position calculation may also be null if a position cannot currently be calculated. Before each unreliable protocol transmission, it is determined whether the device is in a state where data transmissions are possible (operation 110). For example, on a mobile phone, device-side application programming interfaces (APIs) are checked to assess the current level of cellular signal and determine if a successful unreliable protocol transmission is probable (e.g. whether there is an active phone call or no cell signal). If not, the location data is buffered to either main memory or persistent storage (e.g. MIDP RecordStore) (operation 120). Once it is detected that unreliable protocol transmissions are likely to succeed again, the buffered data is then sent via an unreliable protocol (e.g. UDP) and deleted on the device (operation 115).

Occasionally, an end-to-end connection may be confirmed to determine if a UDP transmission is likely to be received by the receiving device.

If the IP address of the device is publically addressable, confirming an open end-to-end connection may be accomplished by having the receiving device occasionally send an "alive" message via a single unreliable protocol (e.g. UDP) packet to the mobile device. The mobile device will continue to transmit data to the receiving device via an unreliable protocol as long as it continues to receive the scheduled "alive" messages from the receiving device. If an "alive" message is not received at the expected interval, (e.g. the phone is off-network, the user is on a voice call, the server is down), then the method begins buffering location data until the next "alive" message is received. When an "alive" message is again received, all buffered data is sent to the receiving device.

For security and capacity reasons, some cellular networks do not allow mobile phones to be publically addressed via an IP address. Therefore, a server-initiated unreliable protocol (e.g. UDP) packet to the phone may not be possible, or may be cost-prohibitive based on the carrier's cost model. In these situations, a reliable protocol (e.g. TCP) connection from the mobile device to the server can occasionally be opened to determine if there is a successful "alive" response from the server. If there is no response (e.g. the mobile device is off-network, the user is on a voice call, the server is down), then location data is buffered until the next successful response via the reliable protocol. Upon the next successful response, all buffered location data is sent via the unreliable protocol. This is illustrated in the flowchart in FIG. 2A.

Figure 2A:
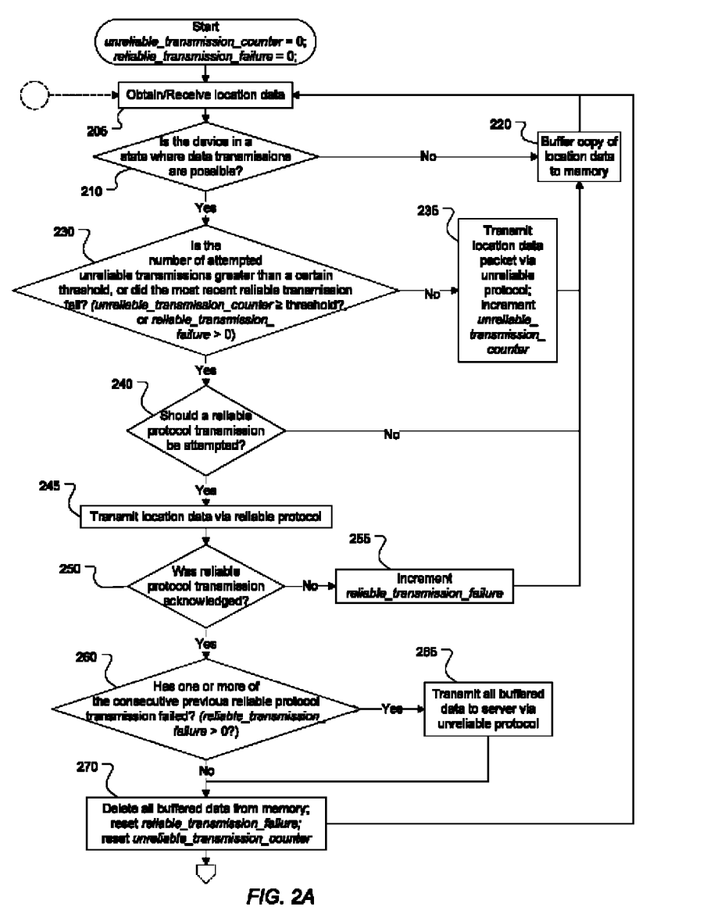
FIG. 2A is a flowchart of the adaptive location data buffering method using both an unreliable protocol and a reliable protocol in accordance with an embodiment of the present invention.

In this embodiment, a copy of all data sent via the unreliable protocol is kept on the device in case the next transmission sent via reliable protocol fails, in which case the buffered data would be resent to the server upon the success of a reliable protocol transmission. As shown in FIG. 2A, the method begins by receiving location data (operation 205). It is then determined whether the device is in a state where data transmissions are possible (operation 210). If transmissions are not possible, the location data is buffered to memory (operation 220). If transmission are possible, it is then determined if a certain number of location data packets have been buffered to memory and if the most recent reliable transmissions failed (operation 230). If the number of buffered location data packets is too small (e.g. unreliable_transmission_counter<threshold) or if the most recent reliable transmission was successful (e.g. reliable_transmission_failure=0), then the current location data is transmitted via an unreliable protocol (operation 235) and a copy of the current location data is also buffered to memory (operation 220).

Once a threshold number of location data packets have been buffered to memory (e.g. unreliable_transmission_counter≥threshold) or if the most recent reliable transmission failed (e.g. reliable_transmission_failure>0), then it is determined whether a reliable protocol transmission should be attempted (operation 240). This determination may be based on the time elapsed since the last reliable protocol transmission or the statistics based on the success rate of the last N number of reliable protocol transmissions.

If it is determined that a reliable protocol transmission will not likely be successful, then a copy of the current location data is buffered to memory (operation 220). If a reliable protocol transmission will likely be successful, then the current location data is transmitted via a reliable protocol (e.g. TCP) (operation 245). It is then determined whether the reliable protocol transmission was acknowledged by the receiving device (operation 250). If the reliable protocol transmission was not acknowledged, then the method tracks the number of failed reliable protocol transmissions (operation 255) and buffers a copy of the location data to memory (operation 220). If an acknowledgement is received, then it is determined if one or more of the consecutive previous reliable protocol transmissions failed (i.e. reliable_transmission_failure>0) (operation 260). If the prior reliable protocol transmission was successful, then the buffered data is deleted from memory (operation 270). However, if it was not, then all of the buffered data is transmitted via an unreliable protocol (operation 265) before it is deleted from memory (operation 270).

If storage space is limited on a device (e.g. a cell phone), data buffering may be limited to a certain number of location data packets. In the embodiment illustrated in the flowchart in FIG. 2B, data is only buffered to memory after a failure of a reliable protocol transmission. In this manner, if the reliable protocol transmission fails, then the next group of data that would have to have been transmitted by the unreliable protocol will be buffered to avoid losing it in transit to the receiving device. However, unlike the embodiment shown in FIG. 2A, it is assumed that any data already transmitted via the unreliable protocol (prior to the failure of the reliable protocol transmission) is lost and will not be-retransmitted because a copy of that data was not saved on the device. When the next reliable transmission succeeds, then all buffered data is sent the receiving device via the unreliable protocol. If on-board memory becomes full during the buffering process, then older location data in the buffer can be overwritten or the newest location data can be discarded, depending on the preference of the application.

Figure 2B:
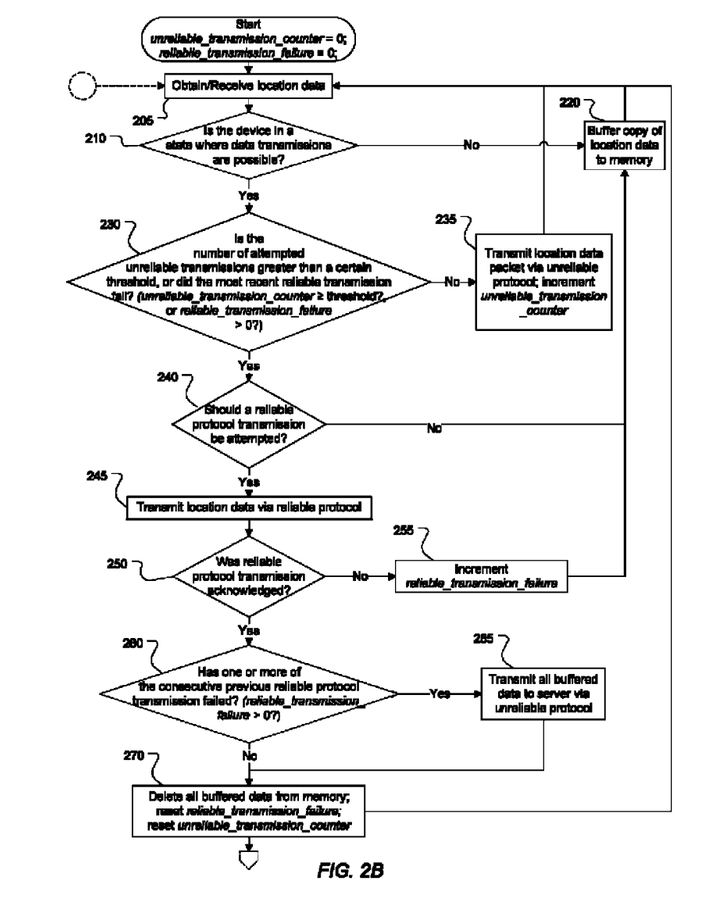
FIG. 2B is a flowchart of the adaptive location data buffering method using both an unreliable protocol and a reliable protocol and buffering a reduced amount of location data compared to the embodiment shown in FIG. 2A in accordance with an embodiment of the present invention.

As shown in FIG. 2B, this embodiment is similar to the embodiment shown in FIG. 2A except that once a location data packet is transmitted via an unreliable protocol in operation 235, the method begins a new iteration at operation 205. A copy of location data packet is not buffered to memory (operation 220), as it is done in the embodiment shown in FIG. 2A.

Figure 2C:
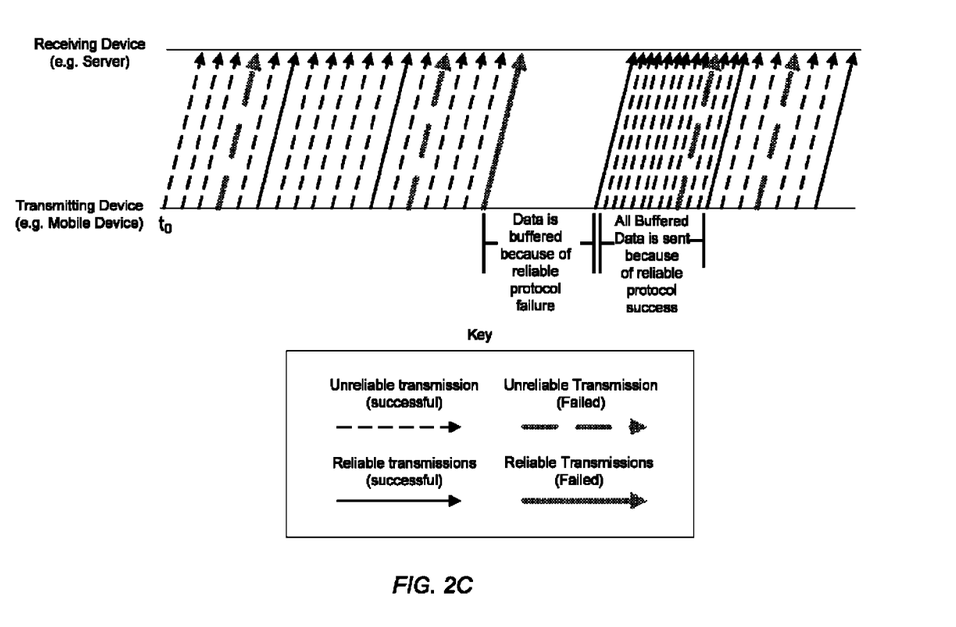
FIG. 2C is a example timeline showing the transmissions sent via reliable and unreliable protocols between a transmitting device and a receiving device using the embodiment of the adaptive location data buffering method illustrated in FIG. 2B.

A timeline illustrating an example execution of the embodiment shown in FIG. 2B is shown in FIG. 2C. As shown in FIG. 2C, if a reliable protocol transmission fails, then all future transmissions that would have occurred via the unreliable protocol are buffered until the next successful reliable protocol transmission. Upon the next successful reliable protocol transmission, all buffered data is sent to the receiving device using the unreliable protocol. Failures of transmissions via the unreliable protocol do not affect the method, because failed transmission via unreliable protocol are unknown at the mobile device. Therefore, the mobile device is improving the probability that the majority of data will arrive at the receiving device by occasionally "prodding" the receiving device to see if it is receiving data.

Figure 3A:
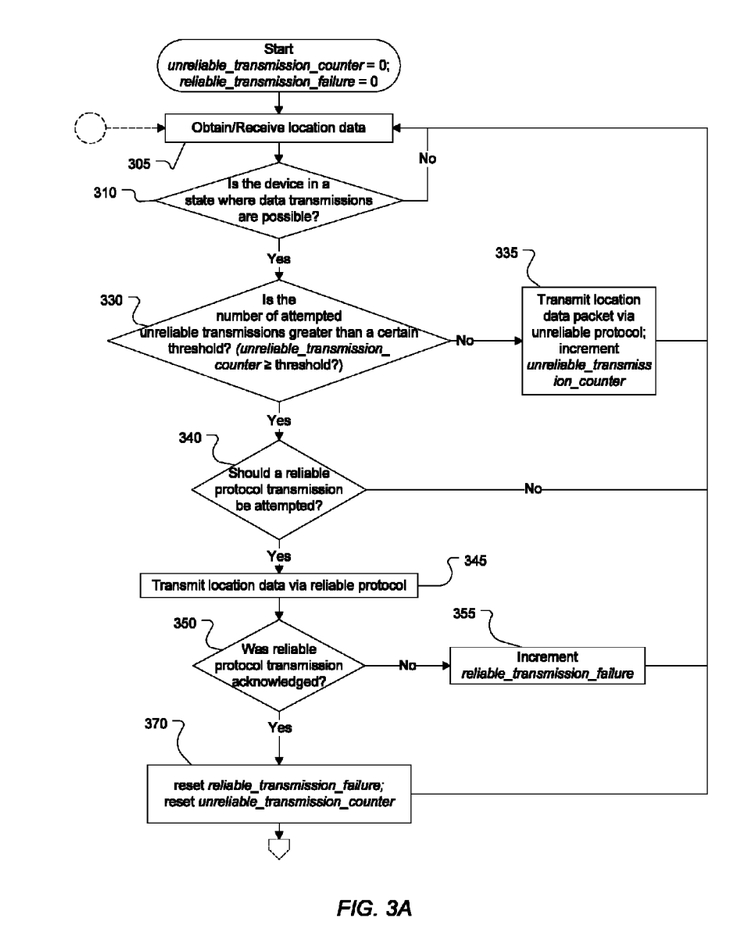
FIG. 3A is a flowchart of the adaptive location data buffering method without a buffering mechanism in accordance with an embodiment of the present invention.

If there is very limited or no on-board memory accessible to the application for data storage (e.g. wireless sensor network), data buffering can be removed from the method completely, as illustrated in the embodiment shown in the flowchart in FIG. 3A. In this embodiment, no data is buffered to memory. Occasionally, a location data packet is transmitted via a reliable protocol, so the mobile device will be aware of whether or not the receiving device is receiving the information.

As shown in FIG. 3A, the method begins by receiving location data (operation 305). It is then determined whether the device is in a state where data transmissions are possible (operation 310). Once transmissions are possible, it is determined whether a certain number of location data packets have been transmitted via an unreliable protocol since the last reliable transmission was acknowledged (operation 330). If the number of location data packets transmitted via an unreliable protocol is too small, then the current location data is transmitted via an unreliable protocol (operation 335).

Once a threshold number of location data packets have been transmitted via unreliable protocol, then it is determined whether a reliable protocol transmission should be attempted (operation 340). This determination may be based on the time elapsed since the last reliable protocol transmission or the statistics based on the success rate of the last N number of reliable protocol transmissions. If it is determined that a reliable protocol transmission will not likely be successful, then the method begins a new iteration. If a reliable protocol transmission will likely be successful, then the current location data is transmitted via a reliable protocol (e.g. TCP) (operation 345). It is then determined whether the reliable protocol transmission was acknowledged by the receiving device (operation 350). If the reliable protocol transmission was not acknowledged, then the method tracks the number of failed reliable protocol transmissions (operation 355). If an acknowledgement is received, then the counters used to track the number of unreliable protocol transmissions and the number of failed reliable protocol transmissions are reset (operation 370) and the method begins a new iteration.

Figure 3B:
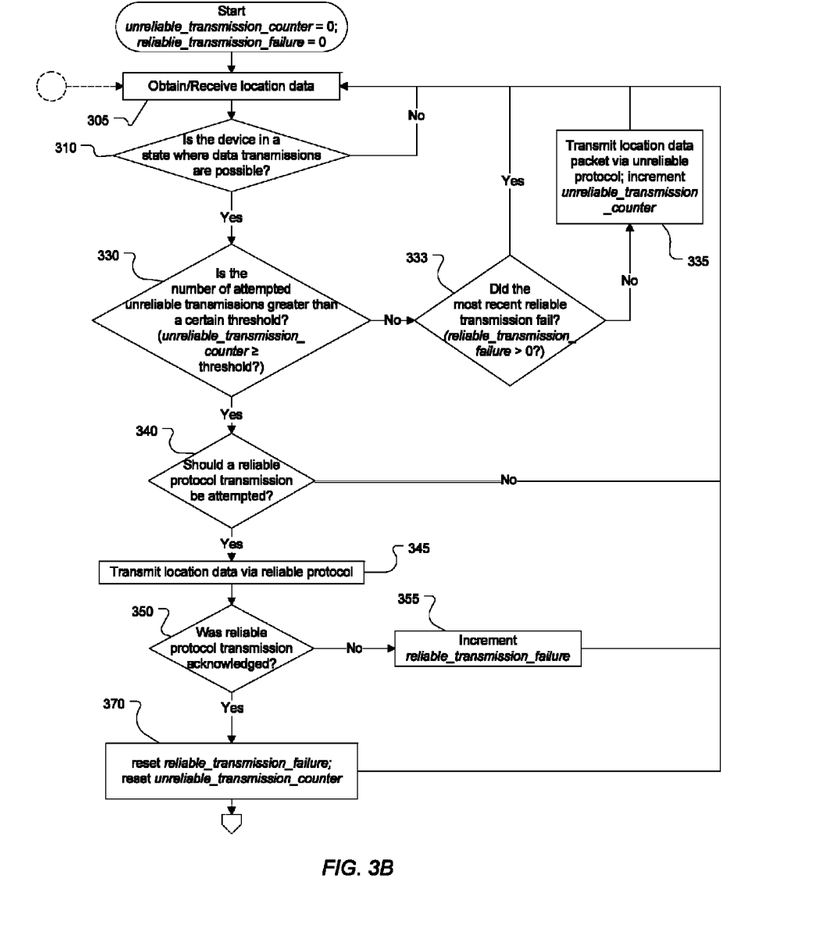
FIG. 3B is a flowchart of an alternative version of the adaptive location data buffering method without a buffering mechanism in accordance with an embodiment of the present invention.

Alternatively, the above embodiment may be adjusted to not transmit any location data if the reliable protocol transmission fails. This would allow the device to save battery energy by not transmitting until it is determined, by a successful reliable protocol transmission, that the communication via unreliable transmission would likely succeed. As show in FIG. 3B, the method mirrors the embodiment shown in FIG. 3A, except that an additional decision must be made (in operation 333) following a determination that the number of transmissions sent via an unreliable protocol are less than a given threshold (operation 330). In operation 333, it is determined if the most recent reliable transmission failed (e.g. reliable_transmission_failure>0). If not (i.e. the most recent reliable transmission was successful), then the method proceeds to operation 335 (as in FIG. 3A) and transmits the current location data packet via an unreliable protocol. However, if the most recent reliable transmission failed, then operation 335 is skipped and the method begins a new iteration.

Other methods such as the Critical Point Method (described in U.S. patent application Ser. No. 12/196,673, herein incorporated by reference), can be used to filter the type of location data that is input into iterations of the current method. The Critical Point Method uses the change in direction between sequential location data points and the user's speed to filter non-critical location points from a set of location data points so that only the critical points, which represent the user's path, remain.

Figure 4:
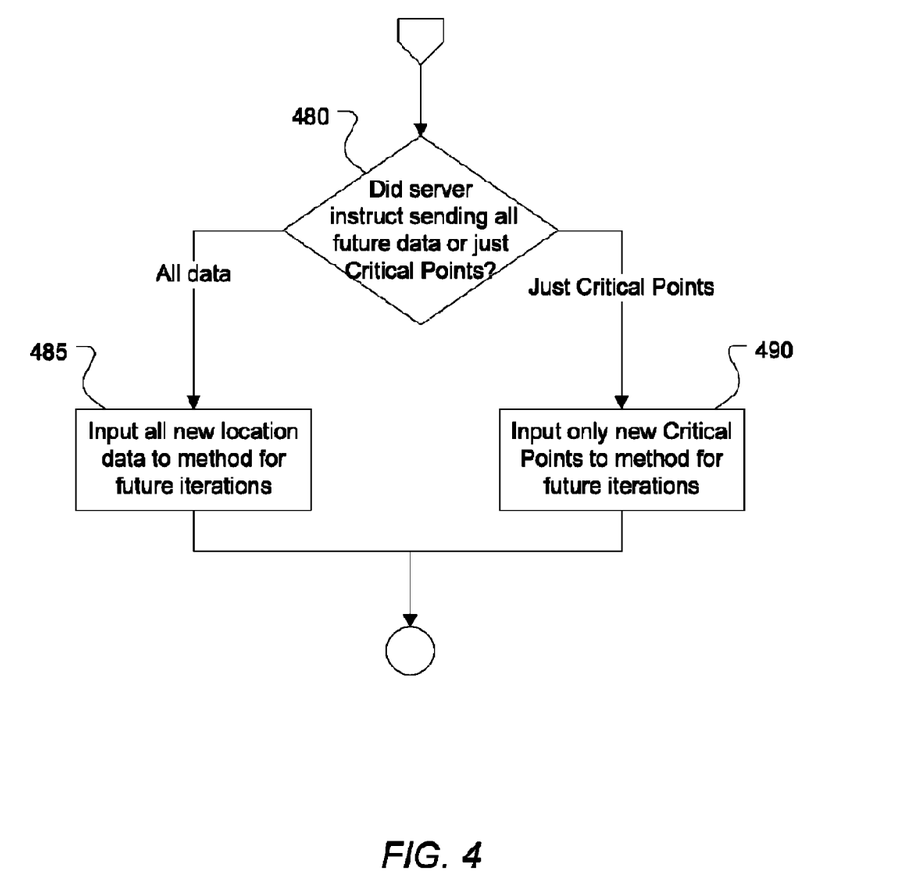
FIG. 4 is a flowchart of showing a supplemental portion of the adaptive location data buffering method used to filter input to future iteration of the method in accordance with an embodiment of the present invention.

Confirmation or "alive" messages from the server (or other receiving device) to the mobile device can also be used to increase system scalability by passing location data flow control instructions back to the mobile device (e.g. turn on Critical Point Algorithm) if the server becomes overwhelmed with location data. As illustrated in FIG. 4, once the method has completed an iteration (after operation 270 of FIGS. 2A and 2B or after operation 370 of FIGS. 3A and 3B), the method determines if the server has sent instructions to send all future data or just critical points (operation 480). Accordingly, either all location data packets (operation 485) or only location data packets representing critical points (operation 490) are passed as input into the current method (at operation 205 of FIGS. 2A and 2B or operation 305 of FIGS. 3A and 3B). The control portion of this module is implemented on the server.

This allows the device receiving the location data (e.g. server or mobile device) to provide some level of service to the transmitting device while avoiding or preventing the receiving device from being overwhelmed by location data. When the receiving device has additional resources to begin receiving all location data again, it can transmit an instruction back to the sending device and the sending device will begin transmitting all location data (i.e. not just critical points) again.

Figure 5:
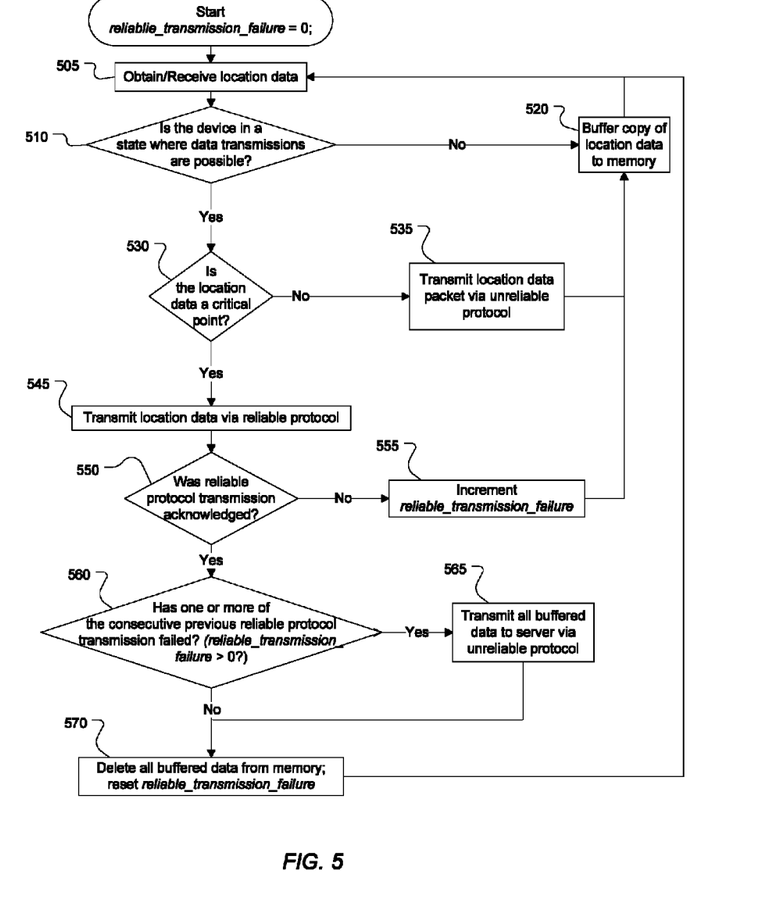
FIG. 5 is a flowchart of the adaptive location data buffering method implementing a use of the Critical Point Method in accordance with an embodiment of the present invention.

The Critical Point Method, or similar method, may also be used to determine whether a reliable or an unreliable protocol will be used to send each location data packet. As shown in FIG. 5, after receiving location data (in operation 505), the method determines if the device is in a state where data transmissions are possible (operation 510). If transmissions are not possible, the location data is buffered to memory (operation 520). If transmissions are possible, it is then determined whether the location data represents a critical point (operation 530). If the location data does not represent a critical point, then the current location data is transmitted via an unreliable protocol (operation 535) and a copy of the current location data is also buffered to memory (operation 520).

Once a critical point is passed into the method, then the current location data representing the critical point is transmitted via a reliable protocol (e.g. TCP) (operation 545). It is then determined whether the reliable protocol transmission was acknowledged by the receiving device (operation 550). If the reliable protocol transmission was not acknowledged, then the method tracks the number of failed reliable protocol transmissions (operation 555) and buffers a copy of the location data to memory (operation 520). If an acknowledgement was received, then it is determined if one or more of the consecutive previous reliable protocol transmissions failed (i.e. reliable_transmission_failure>0) (operation 560). If the prior reliable protocol transmission was successful, then the buffered data is deleted from memory (operation 570). However, if it was not, then all of the buffered data is transmitted via an unreliable protocol (operation 565) before it is deleted from memory (operation 570).

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of buffering location data on a mobile device having a memory storage and access to its location data, the method comprising:
    receiving current location data;
    determining whether the mobile device is in a state where data transmissions are possible;
    buffering the current location data to the memory storage, responsive to the mobile device being in a state where data transmissions are not possible; and
    transmitting the current location data and any buffered location data via an unreliable protocol, responsive to the mobile device being in a state where data transmissions are possible.

2. The method of claim 1, wherein the location data is GPS data.

3. The method of claim 2, wherein the GPS data is received from an on-board GPS system.

4. The method of claim 2, wherein the GPS data is received from a remote GPS system.

5. The method of claim 1, wherein determining whether the device is in a state where data transmissions are possible comprises:
    checking device-side application programming interfaces to assess a current level of cellular signal; and
    determining if a successful unreliable protocol transmission is possible based on the level of the cellular signal.

6. The method of claim 1, wherein determining whether the device is in a state where data transmissions are possible comprises:
    determining if the mobile device is being used for a voice call that interferes with data service.

7. The method of claim 1, further comprising:
    deleting any buffered location data from the memory storage after it is transmitted.

8. The method of claim 1, wherein determining whether the device is in a state where data transmissions are possible comprises:
    receiving a plurality of scheduled alive messages from a receiving device via the unreliable protocol.

9. A method of buffering location data on a mobile device having a memory storage and access to its location data, the method comprising:
    receiving current location data;
    determining whether the mobile device is in a state where data transmissions are possible;
    buffering the current location data to the memory storage, responsive to the mobile device being in a state where data transmissions are not possible;
    determining the number of location data packets that have been buffered to the memory storage, responsive to the mobile device being in a state where data transmissions are possible;
    determining whether the most recent reliable transmissions failed, responsive to the mobile device being in a state where data transmissions are possible;
    transmitting the current location data via an unreliable protocol, responsive to the number of buffered location data being less than a predetermined amount or to most recent reliable transmission being successful;
    determining if a reliable protocol transmission should be attempted, responsive to the number of buffered location data packets not being less than the predetermined amount or to the most recent reliable transmission being unsuccessful;
    buffering the current location data to the memory storage, responsive to the determination that the reliable protocol transmission should not be attempted;
    transmitting the current location data via the reliable protocol, responsive to the determination that the reliable protocol transmission should be attempted;
    determining whether the reliable protocol transmission was acknowledged, responsive to transmission of the current location data via the reliable protocol;
    buffering a copy of the current location data to the memory storage, responsive to the reliable protocol transmission not being acknowledged;
    determining if one or more of the consecutive previous reliable protocol transmissions failed, responsive to the reliable protocol transmission being acknowledged; and
    transmitting all of the buffered location data via the unreliable protocol, responsive to the failure of one or more of the consecutive previous reliable protocol transmissions and to the reliable protocol transmission being acknowledged.

10. The method of claim 9, further comprising:
deleting all of the buffered location data from the memory storage.

11. The method of claim 9, further comprising:
buffering the current location data to the memory storage, responsive to the number of buffered location data being less than a predetermined amount or to most recent reliable transmission being successful.

12. The method of claim 9, wherein the determination of whether the reliable protocol transmission should be attempted is based on the time elapsed since the last reliable protocol transmission.

13. The method of claim 9, wherein the determination of whether the reliable protocol transmission should be attempted is based on the success rate of the last N number of reliable protocol transmissions.

14. The method of claim 9, wherein the location data is GPS data.

15. The method of claim 14, wherein the GPS data is received from an on-board GPS system.

16. The method of claim 14, wherein the GPS data is received from a remote GPS system.

17. The method of claim 9, wherein determining whether the device is in a state where data transmissions are possible comprises:
checking device-side application programming interfaces to assess a current level of cellular signal; and
determining if a successful unreliable protocol transmission is possible based on the level of the cellular signal.

18. The method of claim 9, wherein determining whether the device is in a state where data transmissions are possible comprises:
determining if the mobile device is being used for a voice call that interferes with data service.

19. The method of claim 9, wherein determining whether the device is in a state where data transmissions are possible comprises:
receiving a plurality of scheduled alive messages from a receiving device via the unreliable protocol.

20. A method of transmitting location data on a mobile device having access to its location data, the method comprising:
receiving current location data;
determining whether the mobile device is in a state where data transmissions are possible;
determining whether the number of unreliable transmissions of location data attempted since the last reliable transmission was acknowledged is greater than a predetermined threshold, responsive to the mobile device being in a state were data transmissions are possible;
transmitting the current location data via an unreliable protocol, responsive to the number of unreliable transmissions of location data attempted since the last reliable transmission was acknowledged not being greater than the predetermined threshold;
performing the following operations responsive to the number of unreliable transmissions of location data attempted since the last reliable transmission was acknowledged being greater than the predetermined threshold:
determining whether a reliable protocol transmission should be attempted;
transmitting the current location data via the reliable protocol, responsive to a determination that the reliable protocol transmission should be attempted;
determining whether the reliable protocol transmission was acknowledged, responsive to transmission of the current location data via the reliable protocol;
resetting the number of unreliable protocol transmissions attempted and the number of failed reliable protocol transmissions attempted, responsive to the reliable protocol transmission being acknowledged; and
tracking the number of failed reliable protocol transmissions, responsive to the reliable protocol transmission not being acknowledged.

21. The method of claim 20, wherein the determination of whether the reliable protocol transmission should be attempted is based on the time elapsed since the last reliable protocol transmission.

22. The method of claim 20, wherein the determination of whether the reliable protocol transmission should be attempted is based on the success rate of the last N number of reliable protocol transmissions.

23. The method of claim 20, further comprising:
determining if the most recent reliable transmission was successful, responsive to the number of unreliable transmissions of location data attempted since the last reliable transmission was acknowledged not being greater than the predetermined threshold; and
transmitting the current location data via an unreliable protocol, responsive to the number of unreliable transmissions of location data attempted since the last reliable transmission was acknowledged not being greater than the predetermined threshold and a determination that the most recent reliable transmission was successful.

24. The method of claim 20, wherein the determination of whether the reliable protocol transmission should be attempted is based on the time elapsed since the last reliable protocol transmission.

25. The method of claim 20, wherein the determination of whether the reliable protocol transmission should be attempted is based on the success rate of the last N number of reliable protocol transmissions.

26. The method of claim 20, wherein the location data is GPS data.

27. The method of claim 26, wherein the GPS data is received from an on-board GPS system.

28. The method of claim 26, wherein the GPS data is received from a remote GPS system.

29. The method of claim 20, wherein determining whether the device is in a state where data transmissions are possible comprises:
checking device-side application programming interfaces to assess a current level of cellular signal; and
determining if a successful unreliable protocol transmission is possible based on the level of the cellular signal.

30. The method of claim 20, wherein determining whether the device is in a state where data transmissions are possible comprises:
determining if the mobile device is being used for a voice call that interferes with data service.

31. The method of claim 20, wherein determining whether the device is in a state where data transmissions are possible comprises:
receiving a plurality of scheduled alive messages from a receiving device via the unreliable protocol.

32. A method of buffering location data on a mobile device having a memory storage and access to its location data, the method comprising:
receiving current location data;
determining whether the mobile device is in a state where data transmissions are possible;
buffering the current location data to the memory storage, responsive to the mobile device being in a state where data transmissions are not possible;
determining if the current location data is a critical point, responsive to the mobile device being in a state where data transmissions are possible;
transmitting the current location data via an unreliable protocol, responsive to the current location data not being a critical point;
transmitting the current location data via a reliable protocol, responsive to the current location data being a critical point;
determining whether the reliable protocol transmission was acknowledged, responsive to transmission of the current location data via the reliable protocol;
buffering a copy of the current location data to memory, responsive to the reliable protocol transmission not being acknowledged;
determining if a consecutive previous reliable protocol transmission failed, responsive to the reliable protocol transmission being acknowledged; and
transmitting all of the buffered location data via the unreliable protocol, responsive to the failure of the consecutive previous reliable protocol transmission and to the reliable protocol transmission being acknowledged.

33. The method of claim 32, further comprising:
deleting all of the buffered location data from the memory storage.

34. The method of claim 32, wherein the location data is GPS data.

35. The method of claim 34, wherein the GPS data is received from an on-board GPS system.

36. The method of claim 34, wherein the GPS data is received from a remote GPS system.

37. The method of claim 32, wherein determining whether the device is in a state where data transmissions are possible comprises:
checking device-side application programming interfaces to assess a current level of cellular signal; and
determining if a successful unreliable protocol transmission is possible based on the level of the cellular signal.

38. The method of claim 32, wherein determining whether the device is in a state where data transmissions are possible comprises:
determining if the mobile device is being used for a voice call that interferes with data service.

39. The method of claim 32, wherein determining whether the device is in a state where data transmissions are possible comprises:
receiving a plurality of scheduled alive messages from a receiving device via the unreliable protocol.

40. A mobile device having access to its location data and adapted to buffer location data, the mobile device comprising:
a processor; and
a memory storage including instructions that cause the mobile device to perform:
receiving current location data;
determining whether the mobile device is in a state where data transmissions are possible;
buffering the current location data to the memory storage, responsive to the mobile device being in a state where data transmissions are not possible; and
transmitting the current location data and any buffered location data via an unreliable protocol, responsive to the mobile device being in a state where data transmissions are possible.

41. The mobile device of claim 40, wherein the location data is GPS data.

42. The mobile device of claim 40, wherein the GPS data is received from an on-board GPS system.

43. The mobile device of claim 40, wherein the GPS data is received from a remote GPS system.

44. The mobile device of claim 39, wherein determining whether the device is in a state where data transmissions are possible comprises:
checking device-side application programming interfaces to assess a current level of cellular signal; and
determining if a successful unreliable protocol transmission is possible based on the level of the cellular signal.

45. The method of claim 39, wherein determining whether the device is in a state where data transmissions are possible comprises:
determining if the mobile device is being used for a voice call that interferes with data service.

46. The mobile device of claim 39, wherein the memory storage further includes instructions that cause the mobile device to perform:
deleting any buffered location data from the memory storage after it is transmitted.

47. The mobile device of claim 39, wherein determining whether the device is in a state where data transmissions are possible comprises:
receiving a plurality of scheduled alive messages from a receiving device via the unreliable protocol.

48. A mobile device having access to its location data and adapted to buffer location data, the mobile device comprising:
a processor; and
a memory storage including instructions that cause the mobile device to perform:
receiving current location data;
determining whether the mobile device is in a state where data transmissions are possible;
buffering the current location data to the memory storage, responsive to the mobile device being in a state where data transmissions are not possible;
determining the number of location data packets that have been buffered to the memory storage, responsive to the mobile device being in a state where data transmissions are possible;
determining whether the most recent reliable transmissions failed, responsive to the mobile device being in a state where data transmissions are possible;
transmitting the current location data via an unreliable protocol, responsive to the number of buffered location data being less than a predetermined amount or to most recent reliable transmission being successful;
determining if a reliable protocol transmission should be attempted, responsive to the number of buffered location data packets not being less than the predetermined amount or to the most recent reliable transmission being unsuccessful;
buffering the current location data to the memory storage, responsive to the determination that the reliable protocol transmission should not be attempted;

transmitting the current location data via the reliable protocol, responsive to the determination that the reliable protocol transmission should be attempted;

determining whether the reliable protocol transmission was acknowledged, responsive to transmission of the current location data via the reliable protocol;

buffering a copy of the current location data to the memory storage, responsive to the reliable protocol transmission not being acknowledged;

determining if one or more of the consecutive previous reliable protocol transmissions failed, responsive to the reliable protocol transmission being acknowledged; and transmitting all of the buffered location data via the unreliable protocol, responsive to the failure of one or more of the consecutive previous reliable protocol transmissions and to the reliable protocol transmission being acknowledged.

49. The mobile device of claim 48, wherein the memory storage further includes instructions that cause the mobile device to perform:

deleting all of the buffered location data from the memory storage.

50. The mobile device of claim 48, wherein the memory storage further includes instructions that cause the mobile device to perform:

buffering the current location data to the memory storage, responsive to the number of buffered location data being less than a predetermined amount or to most recent reliable transmission being successful.

51. The mobile device of claim 48, wherein the determination of whether the reliable protocol transmission should be attempted is based on the time elapsed since the last reliable protocol transmission.

52. The mobile device of claim 48, wherein the determination of whether the reliable protocol transmission should be attempted is based on the success rate of the last N number of reliable protocol transmissions.

53. The mobile device of claim 48, wherein the location data is GPS data.

54. The mobile device of claim 53, wherein the GPS data is received from an on-board GPS system.

55. The mobile device of claim 53, wherein the GPS data is received from a remote GPS system.

56. The mobile device of claim 48, wherein determining whether the device is in a state where data transmissions are possible comprises:

checking device-side application programming interfaces to assess a current level of cellular signal; and determining if a successful unreliable protocol transmission is possible based on the level of the cellular signal.

57. The method of claim 48, wherein determining whether the device is in a state where data transmissions are possible comprises:

determining if the mobile device is being used for a voice call that interferes with data service.

58. The mobile device of claim 48, wherein determining whether the device is in a state where data transmissions are possible comprises:

receiving a plurality of scheduled alive messages from a receiving device via the unreliable protocol.

59. A mobile device having access to its location data and adapted to transmit location data, the mobile device comprising:

a processor; and a memory storage including instructions that cause the mobile device to perform:

receiving current location data;

determining whether the mobile device is in a state where data transmissions are possible;

determining whether the number of unreliable transmissions of location data attempted since the last reliable transmission was acknowledged is greater than a predetermined threshold, responsive to the mobile device being in a state were data transmissions are possible;

transmitting the current location data via an unreliable protocol, responsive to the number of unreliable transmissions of location data attempted since the last reliable transmission was acknowledged not being greater than the predetermined threshold;

performing the following operations responsive to the number of unreliable transmissions of location data attempted since the last reliable transmission was acknowledged being greater than the predetermined threshold:

determining whether a reliable protocol transmission should be attempted;

transmitting the current location data via the reliable protocol, responsive to a determination that the reliable protocol transmission should be attempted;

determining whether the reliable protocol transmission was acknowledged, responsive to transmission of the current location data via the reliable protocol;

resetting the number of unreliable protocol transmissions attempted and the number of failed reliable protocol transmissions attempted, responsive to the reliable protocol transmission being acknowledged; and tracking the number of failed reliable protocol transmissions, responsive to the reliable protocol transmission not being acknowledged.

60. The mobile device of claim 59, wherein the determination of whether the reliable protocol transmission should be attempted is based on the time elapsed since the last reliable protocol transmission.

61. The mobile device of claim 59, wherein the determination of whether the reliable protocol transmission should be attempted is based on the success rate of the last N number of reliable protocol transmissions.

62. The mobile device of claim 59, wherein the memory storage further includes instructions that cause the mobile device to perform:

determining if the most recent reliable transmission was successful, responsive to the number of unreliable transmissions of location data attempted since the last reliable transmission was acknowledged not being greater than the predetermined threshold; and transmitting the current location data via an unreliable protocol, responsive to the number of unreliable transmissions of location data attempted since the last reliable transmission was acknowledged not being greater than the predetermined threshold and a determination that the most recent reliable transmission was successful.

63. The mobile device of claim 59, wherein the determination of whether the reliable protocol transmission should be attempted is based on the time elapsed since the last reliable protocol transmission.

64. The mobile device of claim 59, wherein the determination of whether the reliable protocol transmission should be attempted is based on the success rate of the last N number of reliable protocol transmissions.

65. The mobile device of claim 59, wherein the location data is GPS data.

66. The mobile device of claim 65, wherein the GPS data is received from an on-board GPS system.

67. The mobile device of claim 65, wherein the GPS data is received from a remote GPS system.

68. The mobile device of claim 59, wherein determining whether the device is in a state where data transmissions are possible comprises:
- checking device-side application programming interfaces to assess a current level of cellular signal; and
- determining if a successful unreliable protocol transmission is possible based on the level of the cellular signal.

69. The method of claim 59, wherein determining whether the device is in a state where data transmissions are possible comprises:
- determining if the mobile device is being used for a voice call that interferes with data service.

70. The mobile device of claim 59, wherein determining whether the device is in a state where data transmissions are possible comprises:
- receiving a plurality of scheduled alive messages from a receiving device via the unreliable protocol.

71. A mobile device having access to its location data and adapted to buffer location data, the mobile device comprising:
- a processor; and
- a memory storage including instructions that cause the mobile device to perform:
  - receiving current location data;
  - determining whether the mobile device is in a state where data transmissions are possible;
  - buffering the current location data to the memory storage, responsive to the mobile device being in a state where data transmissions are not possible;
  - determining if the current location data is a critical point, responsive to the mobile device being in a state where data transmissions are possible;
  - transmitting the current location data via an unreliable protocol, responsive to the current location data not being a critical point;
  - transmitting the current location data via a reliable protocol, responsive to the current location data being a critical point;
  - determining whether the reliable protocol transmission was acknowledged, responsive to transmission of the current location data via the reliable protocol;
  - buffering a copy of the current location data to memory, responsive to the reliable protocol transmission not being acknowledged;
  - determining if a consecutive previous reliable protocol transmission failed, responsive to the reliable protocol transmission being acknowledged; and
  - transmitting all of the buffered location data via the unreliable protocol, responsive to the failure of the consecutive previous reliable protocol transmission and to the reliable protocol transmission being acknowledged.

72. The mobile device of claim 71, wherein the memory storage further includes instructions that cause the mobile device to perform:
- deleting all of the buffered location data from the memory storage.

73. The mobile device of claim 71, wherein the location data is GPS data.

74. The mobile device of claim 73, wherein the GPS data is received from an on-board GPS system.

75. The mobile device of claim 73, wherein the GPS data is received from a remote GPS system.

76. The mobile device of claim 71, wherein determining whether the device is in a state where data transmissions are possible comprises:
- checking device-side application programming interfaces to assess a current level of cellular signal; and
- determining if a successful unreliable protocol transmission is possible based on the level of the cellular signal.

77. The method of claim 71, wherein determining whether the device is in a state where data transmissions are possible comprises:
- determining if the mobile device is being used for a voice call that interferes with data service.

78. The mobile device of claim 71, wherein determining whether the device is in a state where data transmissions are possible comprises:
- receiving a plurality of scheduled alive messages from a receiving device via the unreliable protocol.

* * * * *